Oct. 31, 1961 R. B. KING ET AL 3,006,237
OPTICAL DEVICE FOR VIEWING AND GENERATING CURVED LINES
Filed Sept. 11, 1959 3 Sheets-Sheet 1

INVENTORS,
ROBERT B. KING,
BY CHARLES E. ROOS;

*Calvin Brown,*
ATTORNEY

Oct. 31, 1961   R. B. KING ET AL   3,006,237
OPTICAL DEVICE FOR VIEWING AND GENERATING CURVED LINES
Filed Sept. 11, 1959   3 Sheets-Sheet 3

INVENTORS,
ROBERT B. KING,
BY CHARLES E. ROOS;

ATTORNEY

United States Patent Office 3,006,237
Patented Oct. 31, 1961

3,006,237
OPTICAL DEVICE FOR VIEWING AND
GENERATING CURVED LINES
Robert B. King, 1627 E. Mendocino St., Altadena, Calif.,
and Charles E. Roos, Riverside, Calif. (2507 Ridge-
wood Drive, Nashville 5, Tenn.)
Filed Sept. 11, 1959, Ser. No. 839,487
7 Claims. (Cl. 88—2.4)

The present invention relates to an optical device adapted to measure the magnitude of the radius of curvature of a segment of a curved line lying in a plane and to determine the direction of the radius of the segment of the curved line.

An object of the invention is to provide an optical means and method which is useful in the manufacture and inspection in measuring curvatures which are only segments of curves and where curvatures are not readily measured by calipers or other simple means such as in the case of turbine blades, larger gear teeth, radii on corners, wing surfaces, etc.

A further object is the provision of optical means which offers a quick and simple method of measuring the curvatures of tracks of elementary physical particles such as electrons, protons, mesons, etc., appearing in cloud chamber and bubble chamber photographs or in nuclear emulsions.

A further object is the provision of means for determining the changing curvature of a plotted trajectory for measuring the curvatures of small adjoining segments along the curve. With respect to this object trajectories of projectiles, missiles and satellites are often plotted from observational data and the present device is particularly adaptable for this purpose.

A further object is the provision of a device which provides a new and simple optical differentiating and integrating system which may serve as a transition device between digital and analog computers.

A further object is the provision of a device which readily measures the magnitude and direction of the radii of curvature of small adjoining segments along a curve, particularly in cases where the curve is not circular, that is, where the radius of curvature changes along the curve. With the invention, a continuous record of the change in curvature along the curve is obtained.

A further object is the provision of an optical system and means which is accurate in measurement, easily used by a scientist or engineer, which solves complex problems relating to curvature, is adaptable for many uses and purposes, may be calibrated so as to make solution of complex problems easy and which is superior to method and means for the purpose intended now known to the inventors.

In the drawings we have illustrated in FIGURES 1 to 4 a simple form of our invention in which, FIGURE 1 is a side elevation thereof showing a dial member;

Figure 1:
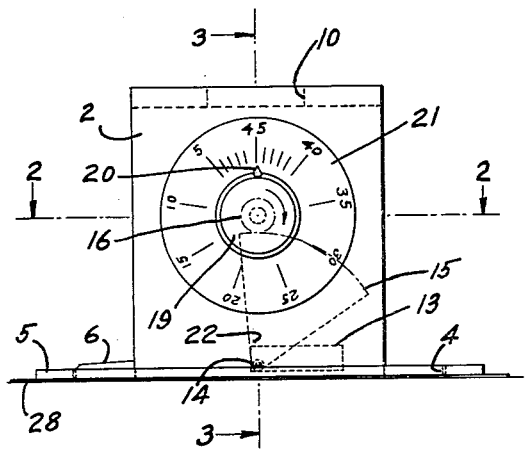

Referring now to the drawings, and specifically to FIGURES 1 to 4 inclusive, wherein we have shown an elementary form of our invention, 1 and 2 are a pair of substantially parallel standards secured to a base member 3 which has a circular edge 4 and fits within an annular scale member 5. Base 3 with the standards mounted thereon may be revolved within the annulus 5. The base 3 is provided with a pointer or index mark 6 adjacent the scale markings 7 on the annulus 5. A top piece or pieces join the two standards, as shown at 8 and 9 leaving a central intervening space; or we may form a solid top piece and provide the same with a central opening 10, the result being the same in each instance.

Figure 2:
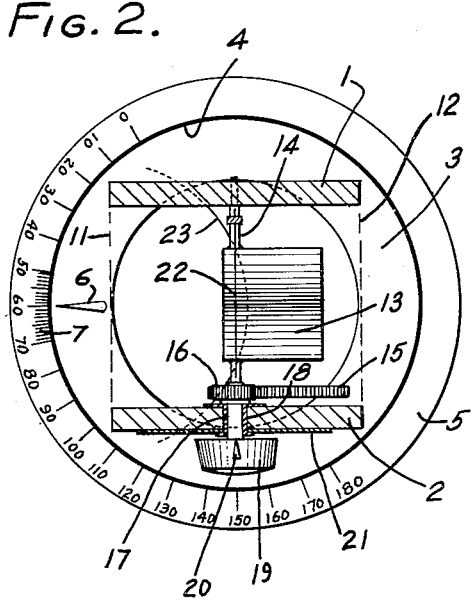
FIGURE 2 is a sectional view on the line 2—2 of FIGURE 1.
Figure 3:
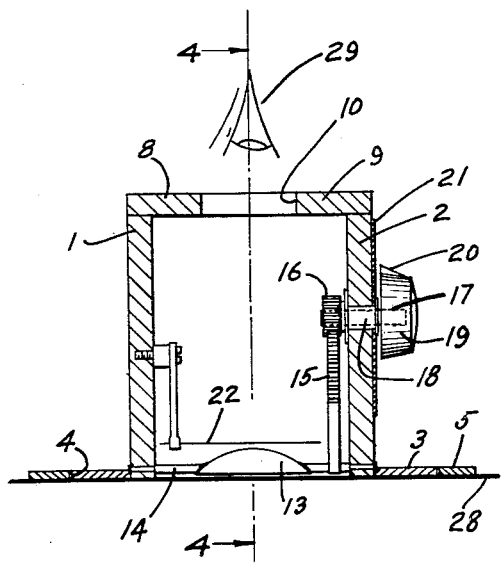
FIGURE 3 is a sectional view on the line 3—3 of FIGURE 1.
Figure 4:
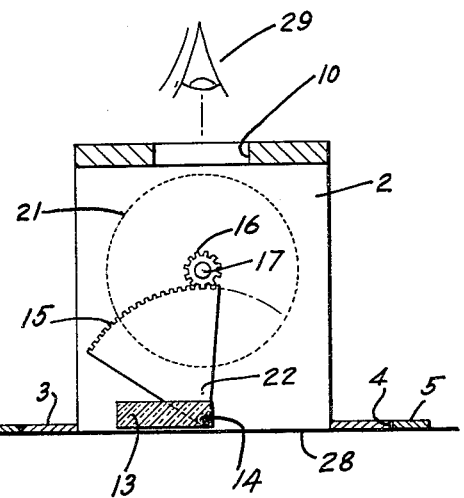
FIGURE 4 is a sectional view on the line 4—4 of FIGURE 3.

We have not detailed in the simple form of device shown any means for interconnecting the annulus 5 bearing the scale 7 with the base 3, although it is obvious that in actual practice a suitable structure, in this regard, would be provided. The annulus 5 does not rotate while the base 3 with the standards may be turned within the annulus. The area of the base between the standards 1 and 2 is open and to accomplish this we may form the base member 3 as an annulus or we may cut out the area between the two standards as illustrated by the dotted lines at 11 and 12 in FIGURE 2. Such a construction gives sufficient support for the standards 1 and 2 in their connection with the base. The reason for such a construction so far as the opening in the base 3 is concerned, is to closely position a lens 13 of cylindrical type as closely to the bottom surface of the base as possible and still permit a tilting of the lens. In the cylindrical lens shown, the curvature of the convex surface is such as to be on a constant radius relative to a straight line axis of revolution. This lens has a plane bottom face and the axis of revolution of the convex surface is parallel to the plane face. In the present instance, the curved surface intersects the plane surface to form sharp edges although, as will be pointed out later, the edges need not necessarily be sharp but may be blunt. The line axis of revolution of the curved surface of the lens is parallel to the plane surface of the lens and lies in a plane which is perpendicular to and bisects the plane surface. If both surfaces of the lens are portions of cylindrical surfaces (but not of the same cylinder, as in a rod) the line axes of revolution of both surfaces will be parallel to one another and both axes will lie in a plane which bisects the lens. This plane is analogous to the optic axis of a lens formed by coaxial spherical surfaces of revolution. However, in describing the functions of the lens it will be convenient to arbitrarily define as the axis of the lens a straight line in the plane of and parallel to the axes of revolution of the surfaces and lying in a plane defined by the lines of intersection of the curved surfaces, as of the curved and plane surfaces if the lens is a plano-convex lens, or in the center of the lens itself if the lens has concave surfaces which do not intersect. For brevity we shall hereafter refer to this line as the axis of the lens, unless otherwise specified. The lens may be tilted by rotating the lens axis so defined in a vertical plane (plane containing the axes of revolution of the surfaces) about a horizontal axis perpendicular to the plane containing the axes of revolution of the surfaces of the lens. Hereafter, rotation of the lens axis so defined in this manner will be referred to as tilting the lens or as tilting the axis of the lens. To accomplish this, a transverse shaft 14 extends between the standards 1 and 2 adjacent the bases of said standards with said shaft cemented to or otherwise held to the lens in substantially right angular relationship to the axis of said lens and preferably adjacent one end of said lens, as shown in FIGURES 2 and 4. Secured to the shaft 14 adjacent one of the standards; to wit: standard 2, is a segmental gear 15 the teeth of which mesh with a pinion 16 suitably mounted upon a stud shaft 17 passed through bearing 18 in the standard 2 and which stud shaft externally of said standard carries a knob 19 for rotating the stud shaft. Knob 19 carries an index mark 20 for movement relative to scale 21 externally positioned on the standard 2. Scale 21 may be in degrees or other notation, as set forth hereinafter. Thus the turning of the knob 19 will rotate the shaft 14 to in turn tip the lens from horizontal to vertical position and to any intermediate degree relative to horizontal or vertical. Within the scope of our invention we provide a cross-hair 22 supported by one or both of the standards, in the present instance by one of said standards and which cross-hair parallels the shaft 14, immediately above the shaft and closely adjacent the convex surface of the lens 13, as shown in FIGURE 3.

To recapitulate, we have provided as illustrative of a means for carrying out our invention, a device which has two scales, one a horizontal scale 7 and the other a vertical scale 21, a lens 13 of the cylindrical type the plane surface of which is closely adjacent some curve, the radius of which is to be determined, and means for tilting the lens and specifically the axis of the lens as we have defined it relative to horizontal and in a vertical plane.

Figure 10:
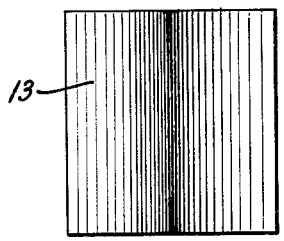
FIGURE 10 is a plan view of a cylindrical lens.
Figure 11:
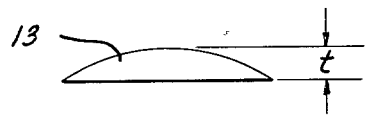
FIGURE 11 is an end elevation of the cylindrical lens of FIGURE 10.
Figure 9:
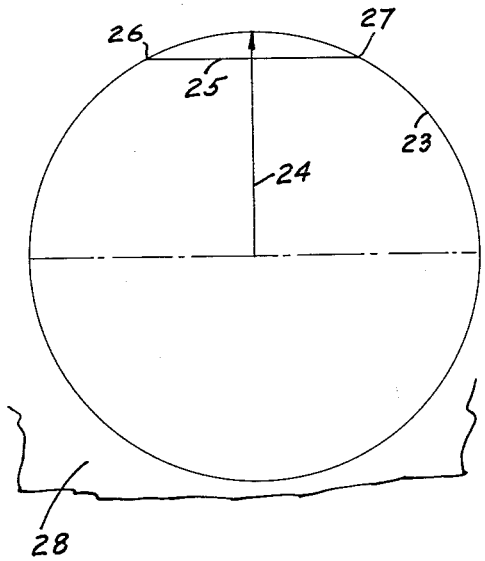
FIGURE 9 is illustrative of a chord of a circle, the circle having a certain radius.
Figure 12:
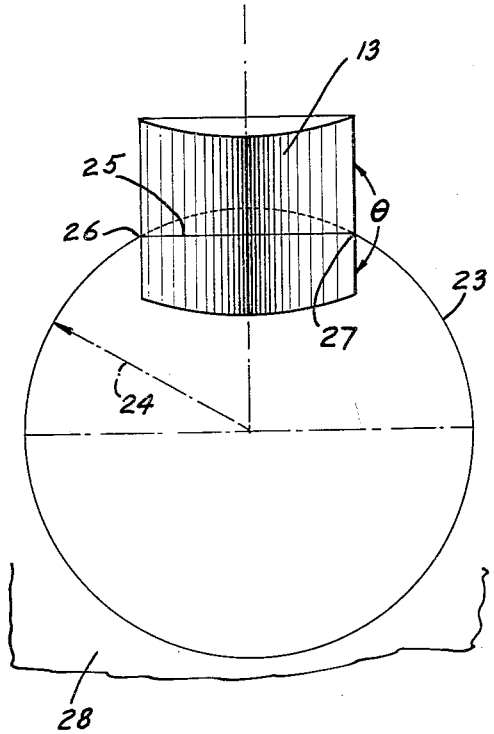
FIGURE 12 is illustrative of the lens of FIGURES 10 and 11 placed over the circle shown in FIGURE 9, the lens being tipped in a vertical plane to provide an angle between the plane face of the lens and the plane of the circle.

To illustrate the method of using the elementary device of FIGURES 1 to 4 inclusive, reference is made to FIGURES 10 to 12 inclusive, and specifically to FIGURE 9 wherein we have shown a circle 23 drawn on a sheet of paper having a radius 24 and a chord at 25 providing a segment of said circle 23, as defined by the limits of the chord at 26 and 27.

The problem is to measure the direction and magnitude of the radius 24 by the means illustrated in FIGURES 1 to 4 inclusive. In this regard, we have again shown the lens 13 both in plan and in end elevation in FIGURES 10 and 11 and the base width of the said lens is of the same dimension as the chord 25. Thus the device of FIGURES 1 to 4 is placed over the circle 23 which appears on the plane of the paper, the paper being designated as 28 in FIGURES 1, 3 and 4. The lens 13 is moved so that the plane face thereof overlies the sheet of paper. In other words, it is parallel thereto, and the device is moved so that the width of the lens face intersects the circle 23 appearing on said sheet in the manner illustrated in FIGURE 12 and defined by the chord limits at 26 and 27. For purposes of illustration, we have assumed a sharp edged plano-cylindrical lens. The index mark 20 for the vertical scale 21 will be at zero, and the pointer 6 indicates the direction or azimuth of the vertical plane containing the axis of the lens 13 with respect to the scale 7 on the annulus 5. The knob 19 is then rotated to tilt the lens 13 upwardly while the eye of the observer indicated at 29 in FIGURES 3 and 4, peers through the opening 10 downwardly to view the cross-hair 22 and the lens 13 and the line of curvature 23, as shown in FIGURE 2. However, when the lens is tilted upon rotation of the knob 19, the curved portion between the limits 26 and 27 commences to straighten and the tilt of the lens continues until the curvature becomes a straight line parallel to and immediately beneath the cross-hair 22 providing that the vertical plane containing the lens axis has been rotated so that the radius 24 of the circle 23 is contained in said plane. When this occurs, if the dials have been calibrated, it is then possible to read directly the radius of curvature 24, its magnitude and direction. If, however, the scale 21 only indicates the degree of tilt of the lens 13, then the radius of curvature may be determined by the general formula, which also applies to a lens with cylindrical surfaces on both faces including in the extreme a simple rod, $$R = \frac{c^2 + 4t^2\left(\sin\theta - \dfrac{\cos\theta\sin\theta}{n\sqrt{1 - \dfrac{\sin^2\theta}{n^2}}}\right)^2}{8t\left(\sin\theta - \dfrac{\cos\theta\sin\theta}{n\sqrt{1 - \dfrac{\sin^2\theta}{n^2}}}\right)}$$

In this formula $c$=the chord or the extended width of the lens.

$t$=the thickness of the lens, being the measurement shown in FIGURE 11.

$\theta$=the angle of the plane surface of the lens relative to a horizontal surface or the tilt of the lens.

$n$=the index of refraction of the lens.

$R$=the radius of the circle.

The derivation of the formula is as follows:

Let $t$=thickness of lens 13 as shown in FIG. 11.

Let $\theta$=angle of tilt of axis of lens 13 as defined in column 4, line 15 measured from the horizontal plane containing the segment of the circle whose curvature is to be measured.

Then, also, $\theta$=angle of incidence on the lower, plane surface of lens 13 of a light ray traveling upward in a vertical direction.

Let $\phi$=angle of refraction of this ray within lens 13.

Let $l$=distance this ray travels within lens 13.

Let $d$=lateral (horizontal) displacement of this ray after it emerges from the upper surface of lens 13 and again travels upward in a vertical direction.

Then, $$d = l \sin(\theta - \phi)$$
and,
$$l = \frac{t}{\cos\phi}$$

$$\therefore d = \frac{t}{\cos\phi}\sin(\theta-\phi) = \frac{t}{\cos\phi}(\sin\theta\cos\phi - \cos\theta\sin\phi)$$

$$= t\sin\theta - t\cos\theta\frac{\sin\phi}{\cos\phi}$$

By Snell's Law of Refraction:

$$\sin\phi = \frac{\sin\theta}{n}$$

Where $n$ is the index of refraction of lens 13.
Now, $$\cos\phi = \sqrt{1 - \sin^2\phi} = \sqrt{1 - \frac{\sin^2\theta}{n^2}}$$

Substituting for $\sin\phi$ and $\cos\phi$ in the equation for $d$, $$d = t\left[\sin\theta - \frac{\cos\theta\sin\theta}{n\sqrt{1 - \dfrac{\sin^2\theta}{n^2}}}\right]$$

Referring to FIG. 9 and FIG. 12, $d$ is the apparent displacement of the point on the circumference of the horizontal circle of radius 24 (FIG. 9) when the axis of lens 13 is tilted through an angle $\theta$ with respect to the horizontal so that this point appears to coincide with the center of the chord 25 as shown in FIG. 12.

If $R$ is the radius 24 of the circle, then in terms of the length $c$ of the chord 25 and the distance $d$, we have from geometry:

$$R = \frac{c^2 + 4d^2}{8d}$$

Substituting for $d$ we have:

$$R = \frac{c^2 + 4t^2\left[\sin\vartheta - \dfrac{\cos\theta \sin\theta}{n\sqrt{1 - \dfrac{\sin^2\theta}{n^2}}}\right]^2}{8t\left[\sin\theta - \dfrac{\cos\theta \sin\theta}{n\sqrt{1 - \dfrac{\sin^2\theta}{n^2}}}\right]}$$

which is the equation given above.

Referring now to FIGURES 5 to 8 inclusive, we have shown certain alternative methods of observation. In each of these methods we have left out the mechanism of FIGURES 1 to 4 inclusive for rotating the lens 13 and the lens 13 and cross-hair 22 assembly about horizontal and vertical axes, these details being omitted for clarity of illustration.

Figure 5:
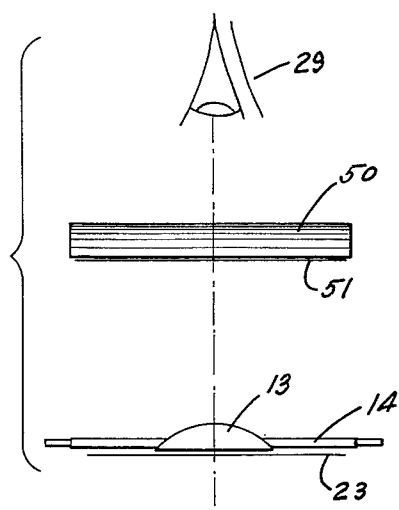
FIGURES 5, 6, 7 and 8 are modifications of the device shown in FIGURES 1 to 4, the said figures showing parts in separated position to illustrate the principle of use.

In FIGURE 5 we have shown two cylindrical lenses; to wit: the lens at 13 and a further cylindrical lens at 50 and above lens 13. The axes of the lenses are in right angular relationship and in place of the cross-hair such as shown at 22, a horizontal straight line 51 is inscribed centrally on one face of lens 50 and parallel to the axis or axes of revolution of the surface of the lens 50. As stated, the axis of lens 50 is parallel to shaft 14 and cuts the vertical axis of the system. The power and position of lens 50 are such as to magnify in a direction perpendicular to shaft 14 the image of the curved line 23 seen by the eye 29 through the lenses 13 and 50 thereby increasing the sensitivity of the instrument.

Figure 6:
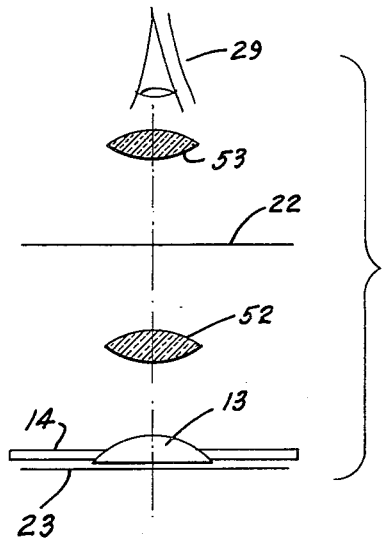

In FIGURE 6, the curved line 23 is viewed through a microscopic system consisting of an objective 52 and eye piece 53. The cross-hair 22 is placed at the focal plane of the eye piece 53 and a real image of the curved line 23 is focused by lens 13 and objective 52 in an horizontal plane containing the cross-hair 22.

Figure 7:
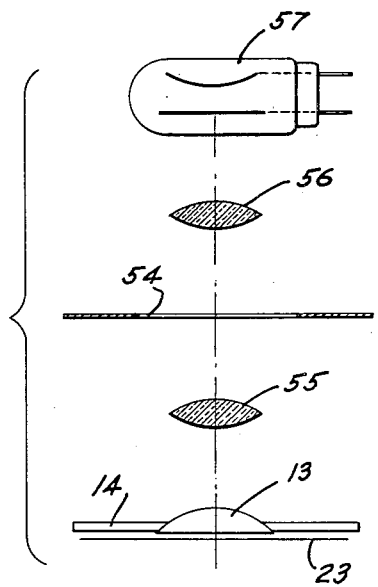

In FIGURE 7 the cross-hair of FIGURES 2, 3 and 6 is replaced by a narrow rectangular opening or slit 54 in an apoque screen lying in a horizontal plane. The length of the slit is parallel to the axis of shaft 14 and cuts the vertical axis of the system. The lens 55 focuses a real image of the curved line 23 as seen through the lens 13 on the plane of the slit 54. Lens 56 focuses a real image of the slit on the sensitive surface of a photoelectric or photoconductive cell 57, or a photomultiplier tube or other light sensitive surface. When the image of the curved line 23 (formed by lenses 13 and 55, by suitable rotation of lens 13 about shaft 14 and of the assembly about the vertical axis) is made parallel and coincident with the slit 54, a maximum or a minimum signal will be given by the photosensitive surface depending upon whether the line 23 is light or dark respectively, compared to the background upon which the line 23 is located. If the photosensitive surface is larger than the slit 54, the lens 56 is not needed; the surface then can be located immediately above the slit 54. Conversely, if the slit 54 is a luminous source or is illuminated from above, as for example, lens 56 focusing the image of the filament of a ribbon filament lamp, located at the position of the photocell, onto the slit 54, then the lenses 55 and 13 will form a curved line image of slit 54 on the plane bearing line 23, the curvature depending on the angle of tilt of the lens 13. This constitutes using the system in reverse.

Figure 8:
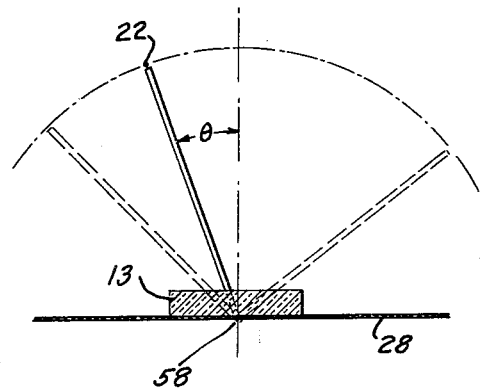

In FIGURE 8, the lens 13 is viewed at 90° with respect to the direction shown in FIGURES 5, 6, and 7. The lens 13 is fixed in a horizontal plane in juxtaposition to the plane containing the curved line 23. The cross-hair 22 or slit 54 is rotated in an arc about the axis, indicated at 58. Any one of the optical assemblies shown in FIGURES 5 to 7 inclusive, may be so constructed as to rotate in this fashion about the fixed lens 13.

The operation, uses and advantages of our invention are as follows.

Firstly, we point out that it is not essential that the entire segment of the curve covered by the lens 13 be visible to the observer, indicated at 29. The central portion of the lens may be used since the principle applies to all portions of the segment. It is no doubt obvious that the cylindrical lens 13 does not magnify the image of the curved line 23 since the said lens is placed in as close proximity as possible to the line, as shown in FIGURES 3 and 4. This position of the lens 13 was chosen to illustrate that the functioning of the device is independent of magnification by the cylindrical lens 13, but does not preclude optical arrangements which utilize the magnifying power of said lens. The apparent positions of every point in the line 23 are displaced by varying amounts by tilting of the lens 13. In FIGURES 9 and 12, the straight line 25 is the chord of a circle of radius 24 lying in a horizontal plane. The length of the chord is the measurement between points 26 and 27. If cylindrical lens 13 has a width equal to the chord length, thickness $t$, as shown in FIGURE 11, an index of refraction $n$, and whose surfaces of curvature intersect at the edges, as shown in FIGURE 10, is placed horizontally on the plane of the circle of FIGURES 9 and 12 with its axis parallel to the radius 24 and bisecting the chord 25 and if the lens 13 is then tilted, as shown in FIGURE 12 by a certain amount $\theta$ with its axis remaining in the vertical plane containing the radius 24, then the image of the arc of the circle covered by the lens may be made to coincide with the position of the chord 25 when viewed from a point along a line perpendicular to the plane of the circle and passing through the intersection of the chord 25 with the radius 24. That is, the image of the arc of the circle becomes a straight line. This latter is true even if the width of the lens is less than the extended width 25 so that the edges of the lens are not sharp. When the image of the curve of the circle seen through lens 13, appears as a straight line, the angled tilt of the lens 13 may be read on the graduated scale 21 and the magnitude of the radius 24 may be coupled from the equation previously given; or the scale 21 may be calibrated for lens 13 so as to read the radius 24 directly. The function of the cross-hair 22 in FIGURE 3, or the etched line 51 in FIGURE 5, or the slit 54 in FIGURE 7 is to furnish a means of determining either visually or by electronic means when the image of the curve 23 becomes a straight line.

The sub assembly containing the lens 13 and the observing system may be detached from a horizontal base containing the graduated scale 7 and attached to the arm of a drafting machine or other mechanism designed to measure angular displacements in the horizontal plane with respect to a fiducial direction. While we have shown the lens 13 as a plano-cylindrical one; that is, a plane surface and a convex surface, almost any combination of positive and/or negative radii of curvatures may be used. The behavior of a convex cylindrical surface lens has been described and a concave cylindrical surface will also produce straight lines in a similar manner except that the displacements in this case are the inverse of those produced by convex surfaces, that is, they will be a minimum at the center and a maximum at the ends of a segment of the curved line 23.

The curved surfaces of lens 13 are in all cases surfaces of revolution about straight line axes. The line axes of the two surfaces of revolution may be parallel, in which case they are both perpendicular to a plane containing the axis of rotation 14, or they may be perpendicular to one another (not, however, intersecting), in which case the axis of revolution of the surface with the smaller radius of curvature, called the primary axis, is perpendicular to the plane containing the axis of rotation 14. The primary surface, the surface of revolution about the primary axis, produces the displacements which we have heretofore described. The secondary surface of revolution about an axis parallel to the axis 14, has a larger radius of curvature than does the primary surface. The function of this type of secondary surface is to avoid distortion at the ends of the curved line 23, as seen through the lens 13 when the radius of curvature of the primary surface is such as to make this desirable. The axis of the lens, as we have heretofore defined it (column 2, lines 53-61) in describing the tilting of lens 13, is, in the case of a lens whose line axes of revolution are perpendicular to one another, to be taken as lying in the center of the lens and parallel to the axis of revolution of the surface with the smaller radius of curvature.

Since all surfaces used for lens 13 are surfaces of revolution about line axes, or one may be plane, and since normally no magnification of the curved line 23 is introduced by lens 13, the apparent displacements of portions of the curved line 23 produced by tilting lens 13, are not related to so-called pin cushion distortion effects produced by tilting a lens with spherical surfaces.

For determining in the manner described above, the shape of conic sections, or the segment of any curve which possesses a second derivative, curvatures of the same form may be applied to the primary surface, or to both surfaces of lens 13. That is, a cylindrical lens surface reduces a circular segment to a straight line, a parabolic lens surface reduces a parabolic line segment, etc.

From the aforesaid description of our invention, it may readily be seen how the invention in its several forms may be used to measure the radius of curvature and the direction of the center of curvature of a segment of a curve drawn, photographed, or otherwise inscribed on a plane surface. The curve may be involved in a drawing of mechanical parts, assemblies, architectural features, or a feature on maps of any sort, photographs, or it may be a curve drawn through a series of points representing observational or computational data. The invention may be especially useful in cases where the curve is not circular, that is, where the radius of curvature changes along the curve. The device may then be used to measure the magnitude and direction of the radii or curvature of small adjoining segments of the curve and thus obtain a continuous record of the change in curvature along the curve. In many of these applications the attachment of the sub assembly containing the cylindrical lens and observing system to the arm of a drafting machine, as previously described, may be most suitable.

The invention is not limited to measurement of curvatures of lines appearing on plane sheets of paper or photographs. Radii and centers of curvature may be similarly determined for extended surfaces by observation of a plane section perpendicular to the axis of curvature of the piece, as, for example, the end of a cylindrical rod. Thus, the device is useful in the manufacture and inspection in measuring curvatures which are only segments of curves and where the curvatures are not readily measured by calipers or other simple means such as in the case of turbine blades, gear teeth, etc.

We have previously pointed out that the invention offers a quick and simple means of measuring the curvature of tracks of elementary physical particles such as electrons, protons, mesons, etc. and further the application of the invention to trajectories of projectiles, missiles and satellites. The invention offers a quick and simple means of determining the changing curvature of such a plotted trajectory by measuring the curvature of small adjoining segments along the curve. If this curve, or any other type of curve, is drawn through observational points, which, because of uncertainties inherent in an individual measurement, are scattered about the position of the mean curve, a rapid means of determining the statistical spread of the points from the curve is offered by placing at the position of the cross-hair, a transparent plate on which is inscribed the cross-hair and parallel to it and on each side of a series of lines spaced in accordance with the scale of the plot. Then, when the cylindrical lens is tilted and the segment of the curve is made to coincide with the cross-hair, the images of the points lying near the curve will be displaced by the same amounts as the nearest point of the curve itself and their distances from the curve may be determined with the aid of a "half-grid" of parallel lines.

This invention offers an entirely new concept in computer design for the solution of differential and integral equation.

The tangent to a circle is mathematically defined as being perpendicular to the radius of the circle at the point of tangency. We have described the means by which the direction and magnitude of the radius of curvature are determined and the direction of the tangent is therefore established. The direction of the tangent or slope to a curve is mathematically the first derivative of the mathematical function represented by the curve where the term derivative is used in its ordinary mathematical sense. In addition the magnitude of the radius of curvature at any point on a curve, is a measure of the rate of change of the direction of the tangent at said point, and is therefore a measure of the second derivative of the curve. Consequently, the invention may be used to determine both the first and second derivatives of a mathematical function represented by the curve. In this application, suitably calibrated dials may be used to read these quantities directly. The third and higher order derivatives are functions of the rate of change of the radii of curvature as measure at different points along the curve.

A luminous line at slit 54 of FIGURE 7 may be projected through the cylindrical lens 13 to form a curved line image in the plane 23. Used thus in reverse, the integral of many functions can be generated by using the values of the first and second derivatives of a function which the curve is to represent respectively, by the orientation and angle of tilt of the axis of the cylindrical lens, then projecting a straight line source at 54 through the system to form the resulting curve at 23. Television techniques may be used to convert the light in the image at 23 into electrical impulses as required. Thus, in certain manufacturing processes involving generation of curves such as wing surfaces, turbine blades, etc. a set of differential equations could be fed into an array of one or more of these devices by setting of the dials of orientation and tilt and appear as a machined or formed surface corresponding to their solutions.

We claim:

1. In a device of the character disclosed, a cylindrical lens adapted to be placed in close proximity to and over a segment of a curved line, the axis of the cylindrical lens lying in a plane bisecting a chord of said segment, and means for tilting the axis of said cylindrical lens about an axis of rotation parallel and in close proximity to said chord of the segment with the axis of the lens remaining in a plane perpendicular to the plane of the segment, through a given angle such that when the segment of the curve covered by the lens is viewed through the lens from any point along a lie perpendicular to the plane of the segment, will appear as a straight line coinciding with the chord of the segment of the curved line.

2. Means for measuring the radius of curvature of a segment of a curved line and the direction of the center of curvature with respect to the segment including: a cylindrical lens for placement across the segment with the axis of the lens lying along the radius of the segment, means for tilting the axis of the lens upwardly while viewing the segment of the curved line along a line perpendicular to the plane of the segment until the segment appears as a straight line coinciding with the chord of the segment to thereby determine the radius of curvature of the segment of the curved line, the angle of tilt of the lens, the index of refraction of the lens and the central thickness of the lens being known.

3. A device to measure by optical and mechanical means the radius of curvature of a segment of a curved line lying in a horizontal plane and the direction of the center of curvature with respect to the segment including: a cylindrical lens, means for tilting the axis of said cylindrical lens in a vertical plane, means of determining the angle of lens tilt relative to a horizontal plane containing said segment and means for determining the degree of rotation in a horizontal plane of the vertical plane containing the axis of the lens.

4. A device to measure the radius of curvature of a segment of a curved line and the direction of the center of curvature with respect to the segment, including: a cylindrical lens for placement over the segment of a curved line, means for rotating said lens in a horizontal plane, means for tilting the axis of the lens relative to the plane in which said segment lies to straighten the segment of said curved line imaged through the lens, and means for determining when the image of the segment of the curved line becomes a straight line, whereby the degree of rotation and of tilting determine the direction and the magnitude of the radius, respectively.

5. The method of measuring the radius of curvature of a segment of a curved line utilizing a cylindrical lens, which consists in: applying the cylindrical lens over the curved segment, the width of the cylindrical lens and the chord of said curved segment being substantially the same, and placing the axis of said lens parallel to the radius of said curved segment and bisecting the chord, then tilting the lens with the lens axis remaining in a vertical plane containing the radius of said curved segment to such a degree that the virtual image of the segment becomes a straight line and coincides with the position of the chord when viewed from a point along a line perpendicular to the plane of the segment and passing through the intersection of the chord and the radius.

6. The method of measuring simultaneously the first and second derivaties of a smooth continuous curve lying at any point thereon utilizing a cylindrical lens, which consists in: selecting a point on the curve which lies in a horizontal plane, juxtaposing cylindrical lens over said point to obtain a segment of the curve on either side of the point, tilting the axis of the lens in a vertical plane and at the same time rotating said vertical plane containing the axis of the lens about a vertical axis so that the segment of the curve appears as the chord of the curve, then determining the azimuthal angle of the vertical plane containing the lens axis relative to a fiducial line in the horizontal plane containing the curve and also the angle of tilt of the lens axis relative to said horizontal plane.

7. The method of generating a curved line image representative of the integral of a mathematical function whose first and second derivatives are known and whose third and higher order derivatives are zero, which consists in: having the first and second derivatives represented respectively by the orientation of and the angle of tilt of a cylindrical lens, then projecting light from a luminous straight line downwardly along the vertical axis of the cylindrical lens to form a curved line image which represents said integral.

References Cited in the file of this patent

UNITED STATES PATENTS

| | | |
|---|---|---|
| 1,907,873 | Richards et al. | May 9, 1933 |
| 1,933,880 | Tihenko | Nov. 7, 1933 |
| 2,117,441 | McWeeny | May 17, 1938 |
| 2,270,005 | Jansey | Jan. 13, 1942 |

FOREIGN PATENTS

| | | |
|---|---|---|
| 672,563 | Great Britain | May 21, 1952 |